United States Patent [19]
Wolf, Jr.

[11] 3,857,786
[45] Dec. 31, 1974

[54] BRUSHING ACCESSORY FOR SPIN FILTER

[76] Inventor: Leonard H. Wolf, Jr., 1109 N. Sunrise Way, Palm Springs, Calif. 92262

[22] Filed: Oct. 29, 1973

[21] Appl. No.: 410,791

[52] U.S. Cl................................ 210/331, 210/334
[51] Int. Cl............................................. B01d 29/34
[58] Field of Search........................... 210/331, 334

[56] References Cited
UNITED STATES PATENTS

| | | | |
|---|---|---|---|
| 2,799,397 | 7/1957 | Berline | 210/331 |
| 3,019,905 | 2/1962 | Baker et al. | 210/331 X |

*Primary Examiner*—Frank A. Spear, Jr.
*Attorney, Agent, or Firm*—Dana E. Keech

[57] ABSTRACT

In a spin filter, a hollow mandrel is rotatable axially in a filter tank and has mounted thereon a multiple of concentric porous hollow filter discs which open centrally into said mandrel. Liquid, containing impurities, and in some instances mixed with a purifying agent such as dietamaceous earth is delivered into the tank, the impurities being removed therefrom as the liquid passes through the filter discs into the mandrel from one end of which the filtrate is recovered.

It is customary to depend on a periodical reverse flow of filtrate through the filter while spinning the mandrel, for cleaning the deposit of impurities from the filter discs. Following this operation, the deposits thus loosened into the liquid in the tank are flushed from the tank to waste.

The present invention quickens and enhances the cleansing of the filter discs by providing an inexpensive series of brushes disposed between adjacent pairs of filter discs by which the latter are scrubbed during the filter rotating and back washing operation.

3 Claims, 4 Drawing Figures

PATENTED DEC 31 1974 3,857,786

BRUSHING ACCESSORY FOR SPIN FILTER

SUMMARY OF THE INVENTION

It is an object of the present invention to provide a simple and inexpensive system of brushes which is readily installable inside the tank of a conventional pool spin filter and which will greatly improve the effectiveness of the filter cleansing technique above described and thus the operating efficiency of the filter discs.

DETAILED DESCRIPTION OF THE PREFERRED EMBODIMENT

Figure 1:
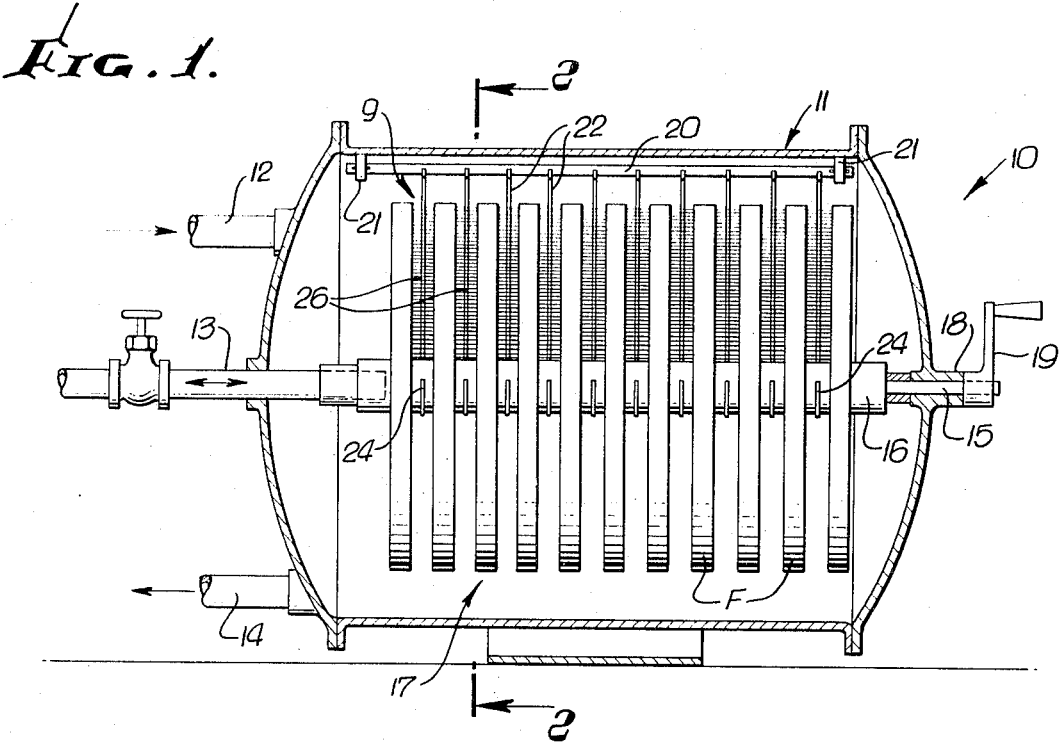
FIG. 1 is a diagrammatic longitudinal vertical sectional view of a preferred embodiment of the invention.

The invention comprises a filter disc brushing accessory 9 which is provided for association with a spin filter 10 having a tank 11 provided with a dirty water inlet 12, a clean water outlet-or-inlet 13 and a dirty water-to-waste pipe 14. Pivotally mounted co-axially within tank 11 on pipe 13 to make a fluid tight fit with the latter and on a shaft 15 at the opposite end thereof, which is closed, is the hollow mandrel 16 of a rotary filter screen 17. The shaft 15 extends through and journals in an axial bearing 18 and is rotatable by hand crank 19. The filter screen 17 is made up of a series of eleven filter discs F which are mounted in parallel concentric spaced relation on the mandrel 16.

Figure 2:
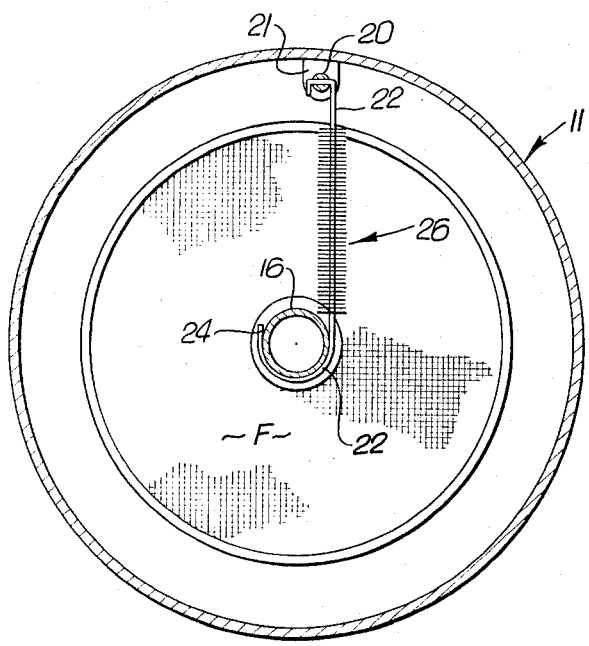
FIG. 2 is an enlarged diagrammatic cross sectional view taken on line 2—2 of FIG. 1 illustrating one of the brush elements of the invention.
Figure 3:
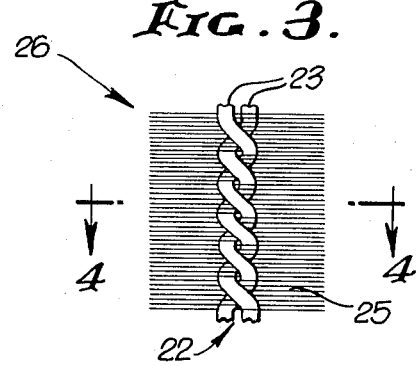
FIG. 3 is an enlarged fragmentary detailed view of the brush embodied in each of said elements.
Figure 4:
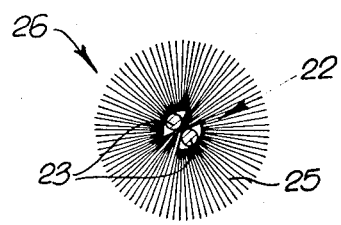
FIG. 4 is a cross sectional view taken on the line 4—4 of FIG. 3.

The invention comprises a bar 20 supported within tank 11 on a pair of lugs 21 which are fastened at spaced points on the inner surface of said tank to support said bar above and in parallel relation with the mandrel 16. Brush stems 22 made up of twisted stainless steel wires 23 are supported at their upper ends on the bar 20 and have hooks 24 formed on their lower ends and bent upwardly therefrom. During the twisting of the wires 23 in the manufacture of stems 22, plastic bristles 25 are introduced between said wires so as to be integrated with stems 22 in the form of cylindrical plastic brushes 26. The bar 20 is provided with a series of transverse holes, one for each brush stem 22 and the upper end of each of the latter is bent to extend through the hole provided for it after which the protruding upper end of said stem 22 is bent downwardly as shown in FIG. 2 to permanently assemble the brush accessory 9 of the invention. The brushes 26 are thus mounted on centers to be spaced from each other the same distances as adjacent filter discs F are spaced apart and each brush 26 lies in the gap between such a pair of adjacent filter discs and is of the proper diameter to be applied with a scrubbing action to the opposed faces of said spaced filter discs whenever the mandrel 16 is rotated by the crank 19.

OPERATION

After the accessory 9 is installed within the spin filter 10 and the circulation of clean water is reversed to flow from pipe 13 into the filter 17 and outwardly from the discs F into the tank 11, the filter 17 is rotated by manually turning the handle 19. This will produce a scrubbing action by the brushes 26 on the lateral faces of the filter discs F which greatly decreases the length of time required to clean from the filter screen 17 the scum and fibrous matter adhering to its exterior surfaces. The adherent material thus removed from the filter screen 17 will be suspended in the water in the sump of the tank 11 thereby permitting this to be discharged through the waste pipe 14 to condition the spin filter 10 for resumption of normal service. When ready for this, the waste pipe 14 is shut off and the reverse flow of filtrate from the pipe 13 into the filter screen 17 is terminated and the normal flow resumed in which the water to be filtered is delivered through the pipe 12 into the tank 11 and the filtrate separated therefrom by the filter 17 to discharge said filtrate back through the pipe 13 into a swimming pool or a storage reservoir whichever the case may be.

I claim:

1. A brushing accessory for a spin filter mounted in a tank for confining a liquid to be filtered and comprising a rotatable hollow mandrel on which a series of spaced filter discs are concentrially mounted in spaced relation, said accessory comprising:

a bar located inside said tank parallel with said mandrel and between said filter discs and said tank;
   means for mounting said bar on said tank;
   a series of parallel brushes spaced apart equidistant with the spacing of said filter discs with one brush being disposed between each adjacent pair of said discs and in constant scrubbing relation with the juxtaposed filtering faces of said pair of discs;
   means for rotatably mounting the inner end of each brush on said mandrel; and
   means for attaching the outer end of each brush to said bar.

2. A brushing accessory as recited in claim 1 wherein said bar is located above said filter discs and wherein said means for rotatably mounting the inner end of each brush on said mandrel comprises a hook means rotatably fitting said mandrel.

3. A filter disc brushing accessory as recited in claim 2 wherein each of said brushes has a stem formed of twisted stainless steel wire between the strands of which a layer of plastic bristles are trapped to form a cylindrical brush embodied with each of said stems; and
   wherein said bar is provided with a series of transverse holes, one for each of said brush stems, each of said stems being bent near its upper end, extended through one of said holes and then rebent downwardly to unite the upper end of said stem with said rod; and wherein
   said hook means consists in a lower end portion of the stem of said brush and located below the lower end of said brush and bent upwardly to hook around the spin filter mandrel.

* * * * *